April 28, 1931. J. G. VINCENT 1,802,544
HYDROCARBON MOTOR
Original Filed Aug. 7, 1917
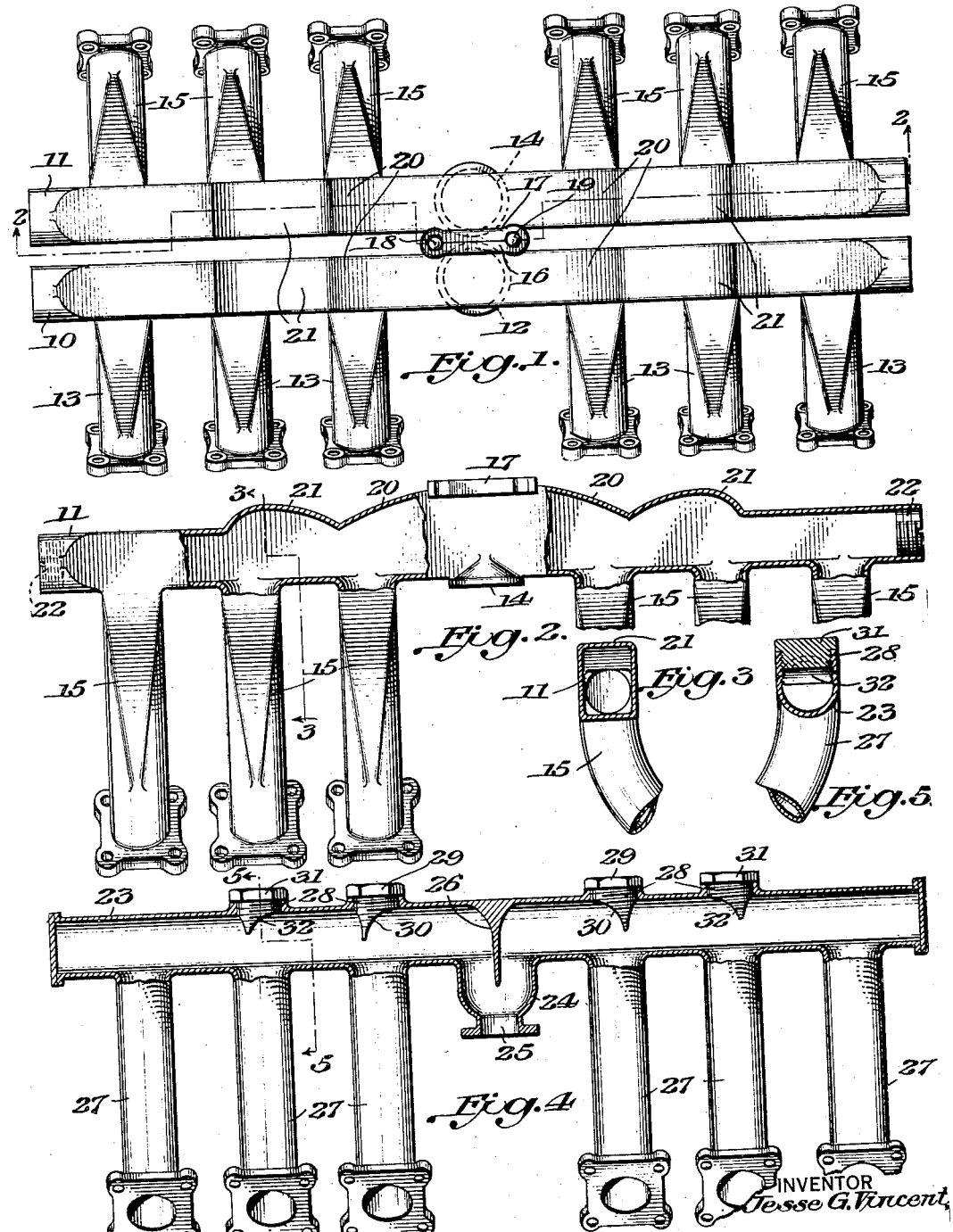

Patented Apr. 28, 1931

1,802,544

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

HYDROCARBON MOTOR

Application filed August 7, 1917, Serial No. 184,913. Renewed August 19, 1925.

This invention relates to hydro-carbon motors and more particularly to an intake manifold for a multicylinder motor.

The principal object of the invention is to provide a means for distributing the mixture uniformly and in equal quantities to the cylinders of a multicylinder motor. Other objects and features of the invention will be apparent from the description taken in connection with the drawings in which:

Figure 1 is a plan view of a pair of intake manifolds embodying the invention as arranged to distribute the mixture to the cylinders of a V type twin six hydrocarbon motor;

Figure 2 is an elevation partly in section taken substantially along the broken line 2—2 of Figure 1 looking in the direction indicated by the arrows;

Figure 3 is a sectional detail taken on the line 3—3 of Figure 2 looking in the direction indicated by the arrows;

Figure 4 is an elevation of another form of the invention, the header being shown in section; and Figure 5 is a sectional detail taken substantially on the line 5—5 of Fig. 4 and looking in the direction indicated by the arrows.

Referring to the drawings, Figure 1 shows a pair of headers 10 and 11, the header 10 having the inlet opening 12 and the six curved branches 13 leading to one set of cylinders, and the header 11 having the inlet opening 14 and the six curved branches 15 leading to the other set of cylinders. The header 10 is provided with a centrally arranged short flange 16 which projects towards the other header 11, and is adapted to abut a similar flange 17 on the latter header, whereby the two headers are held in spaced relation. Each of the flanges is formed with a pair of semicylindrical recesses, the pair of one flange being adapted to register with the pair of the other to provide the bolt holes 18 and 19. The two manifolds are similar except that one is a right and the other is a left. Hence, a description of one will give a complete understanding of the invention.

Referring to Figures 2 and 3 it will be observed that the header is rectangular in cross section, although the invention is not limited to a header of this form, as differently shaped sections might be chosen. One wall of the header has the inlet opening therein and also the openings or entrances into the branches 15 leading to the cylinders, these branches being rectangular where they join the header and gradually changing to a round section at their other ends. The wall of the header opposite the inlet 14 is inclined as at 20, toward the first branch on each side of the inlet. Thus, the stream of mixture rushing through the inlet is deflected toward the entrances to these central branches, thereby causing more of the mixture to enter the same than would have without the deflecting means. In a similar manner the wall opposite the branch next removed from the inlet on each side thereof is formed with a deflecting surface, the wall being bulged out as at 21 for this purpose. The wall at 21, however, is not bulged out as much as at 20, as it is not necessary to deflect the gas stream as much opposite these latter branches as opposite the central ones. As shown in the drawings, no deflecting means is provided for the end branches. The ends of the header may be closed in any desired manner as by the screw plugs 22.

With the headers as heretofore used which have no deflecting means, it is found that the central branches do not receive their share of the mixture, whereas the end branches receive too much. With headers of uniform cross sectional area throughout their length, of course, the amount of gas passing the entrances to the central branches is greater than that passing the entrances to branches further removed from the inlet. Hence the velocity of the gas passing the central branches is higher than when passing the other branches. Because of this higher velocity, not only is it difficult to get the gases to enter the central branches, but an aspirator action must occur which further aggravates the trouble. It will be apparent, however, that according to this invention, a proper distribution of the gases is obtained. The wall 20 which deflects the gases more than the wall 21 because the velocities are greater, aids in causing the correct amount to enter the central branches. Likewise the wall 21 deflects the gases opposite the entrance to the next branch, thus compensating by deflection for the amount which the velocity would tend to carry by. In this way only the proper amount of gas, for the end branch continues along the header.

In Figures 4 and 5 another form of the invention is illustrated. In this embodiment a circular header of uniform cross section throughout its length its shown, although other shapes might be used. The header 23 is formed with a nozzle 24 having the restricted inlet opening 25 and a partition 26 extends across the bore of the header and into the nozzle to thereby divide the gas entering through the nozzle into two streams. The partition is located so as to divide the quantity of gas in proportion to the number of branches on each side thereof. As shown in Figure 4, there are three circular branches 27 on each side of the partition and hence it divides the stream of gases into two equal parts.

For the purpose of deflecting the gases into the branches the wall of the header opposite the branches is formed with the apertures 28, the central ones of which receive the plugs 29 having the deflecting walls 30, and the other apertures receiving the plugs 31 having the shorter deflecting walls 32. If desired the plugs may be screw-threaded into the apertures. Thus in both forms of the invention the deflecting walls are constructed and arranged to exert successively decreasing deflections on the gas stream as it flows from the inlet towards the end of the manifold.

Although a manifold having six branches and a central inlet has been described, it is obvious that the invention is not limited to this particular arrangement, as the location of the inlet and the number of branches may be varied to suit any condition. Furthermore, other forms of deflecting means may be used.

Having thus described my invention, what I claim and desire to secure by Letters Patent is:—

1. An intake manifold for a multicylinder hydrocarbon engine comprising a tubular header having a substantially straight single continuous passage from end to end and branches leading to the cylinders, and means for effecting a uniform distribution of the gas to the branches including a deflecting wall arranged opposite the entrance to one or more of the said branches.

2. An intake manifold for a multicylinder hydrocarbon engine comprising a header having a gas passage of substantially uniform cross sectional area and an inlet intermediate its ends, a plurality of branches symmetrically arranged on opposite sides of said inlet and means for effecting a uniform distribution of gas to the cylinders comprising a deflecting wall opposite the entrance to each of the branches adjacent to said inlet.

3. An intake manifold for a multicylinder hydrocarbon engine comprising a header having a plurality of branches leading to the cylinders, the wall of said header opposite the entrance to one or more of said branches being bulged out whereby the inner surface thereof acts as a deflector.

4. An intake manifold for a six cylinder hydrocarbon engine comprising a header having an inlet substantially midway of its ends, three branches on each side of said inlet leading to the cylinders, and means for effecting a uniform distribution of mixture to the cylinders including a deflecting surface opposite each of the entrances to the two branches adjacent the inlet on each side thereof.

5. An intake manifold for a multicylinder hydrocarbon engine comprising a header having a gas passage, an inlet, branches between the inlet and end of the header leading to the cylinders, gas deflecting means opposite each of the branches adjacent the inlet constructed and arranged to exert successively decreasing deflections of the gas as it travels in the direction from the inlet toward the end of the header.

6. An intake manifold for a multicylinder hydrocarbon engine comprising a tubular header having a substantially straight continuous passage from end to end and an inlet and branches leading to the cylinders, the wall of the header opposite the inlet being inclined towards the opening into the first branch thereby providing a surface for deflecting the gases into said opening.

7. An intake manifold for a multi-cylinder hydrocarbon engine comprising a header of rectangular cross section, one of the walls thereof having an inlet and branches leading to the cylinder, and the opposite wall being formed with individual deflecting surfaces opposite some of the branches to guide the gases into the same.

8. An intake manifold for multi-cylinder hydrocarbon motors comprising a header having a single longitudinally extending gas passage, an inlet and at least two outlets spaced lengthwise of said passage in the order mentioned, and means opposite said outlets, except the one remote from the inlet, to deflect a portion of the gases into the same.

9. An intake manifold for multi-cylinder hydrocarbon motors comprising a header having a single longitudinally extending gas passage, an inlet and three outlets spaced lengthwise of said passage in the order mentioned, and means opposite the two outlets adjacent said inlet, to deflect portions of the gases into the same.

10. A method of distributing a fuel mixture to an engine which consists in moving the mixture in a straight line against a transverse surface from which it is to be distributed to a plurality of engine cylinders, said surface acting to distribute the mixture uniformly in a plurality of directions transverse to said line.

11. An inlet manifold for internal combustion engines comprising a distributing chamber having an inlet duct adapted to deliver a mixture in a straight line thereto and a plurality of outlet ducts, one of the walls of said chamber being flat and one opposite to said inlet duct and symmetrically formed so as to effect uniform distribution of the mixture to all outlet ducts.

In testimony whereof I affix my signature.

JESSE G. VINCENT.